Patented Sept. 8, 1953

2,651,575

UNITED STATES PATENT OFFICE 2,651,575

FRUIT-CONTAINING FROZEN CONFECTIONS AND PROCESS FOR PRODUCING THE SAME

William F. Talburt, Berkeley, and Dante G. Guadagni, Lafayette, Calif., assignors to the United States of America as represented by the Secretary of Agriculture No Drawing. Application November 2, 1951, Serial No. 254,624

14 Claims. (Cl. 99—136)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preparation of frozen confections or desserts, such as ices, sherbets, and ice creams, which contain individual pieces of fruit. In particular this invention concerns the preparation of products of such type in which the pieces of fruit are not hard as they normally would be due to the low temperature at which the confection is stored and consumed but have essentially the same consistency as the main body of the confection and in addition, the fruit pieces enhanced natural flavor.

The problem with which this invention is concerned may be explained as follows, particular reference being made to sherbet merely by way of example since the same factors are involved with ice cream, ices, and similar frozen confections.

Sherbets are usually prepared by freezing an aerated mixture of milk, water, flavoring ingredients, sugar, and stabilizer. Attempts have been made to prepare sherbets containing pieces of fruit to give them more individuality and improved taste and appearance. Products of this type are not successful for the reason that the fruit pieces when frozen become extremely hard so that the product is not palatable. The consumer in eating the product is dismayed by the sharp contrast between the soft texture of the sherbet matrix and the ice-hard lumps of fruit. The explanation of the problem is that fruits are relatively low in soluble solids content, as compared to the sherbets or ice cream mix, so that their freezing point is only a few degrees below the freezing point of water. At the normal storage temperature of sherbets (about 0° F.), each fruit piece is completely frozen to an icy brittle mass. The aeration which gives the sherbet mix its creamy texture obviously has no effect on the texture of the fruit pieces because the air bubbles cannot separate the cellular fruit tissue as they separate the liquid particles of the sherbet mix.

Another problem is that, due to the low temperature at which the sherbet is consumed, the pieces of fruit have little apparent flavor—this is mainly a matter of low temperature which decreases the vapor pressure of the volatile flavoring essences present in the fruit. This problem of apparent loss of flavor strength at the low temperatures of frozen desserts is such that only the stronger flavored fruits, such as strawberry and raspberry, can be successfully used in ice creams and sherbets.

We have found that the problems of unpalatable hardness and lack of flavor in the fruit pieces can be solved expeditiously by a technique which involves initially impregnating the fruit pieces with a full-flavored fruit juice concentrate. For example, apple dice are impregnated with a full-flavored apple juice concentrate. These impregnated apple dice are then incorporated in the usual sherbet mix, the mixture is aerated and frozen. The resulting product is a vast improvement on what has been known heretofore. In the first place, the impregnation introduces so much soluble solids (mostly sugar) into the fruit juices that they no longer freeze hard and dense but have about the same texture as the sherbet matrix. Secondly, the impregnation introduces a substantial increase in amount of volatile flavoring essences so that despite the low temperature at which the sherbet is consumed the fruit pieces have a distinct and highly desirable natural flavor.

The expression "full-flavored fruit juice concentrate" as used herein means a liquid fruit juice concentrate which contains substantially its natural proportion of volatile flavoring essences. Such concentrates are to be distinguished from those which have been prepared by merely concentrating a fruit juice—in such case the flavoring essences are volatilized and lost during the concentration procedure, hence the resulting product is markedly deficient in natural bouquet. In preparing the full-flavored concentrates, the vapors evolved during the concentration are suitably received and subjected to concentration to remove water, then added back to the juice concentrate. The resulting fortified concentrate will have essentially a natural bouquet because it contains the proper proportion of volatile flavoring essences. Full-flavored concentrates may also be prepared by procedures which involve freezing out the water in the original fruit juice. In such procedures, no vaporization losses are involved so that the flavoring essences are retained in the final product. The full-flavored concentrates referred to in the examples herein were prepared by subjecting the fruit juice to an initial evaporation at atmospheric pressure to strip off about 25% of the juice. The vapors from this evaporation were collected and subjected to distillation to concentrate the collected essence about 100-fold. The stripped juice was then further concentrated under vacuum to the desired solids content and then the concentrated essence was admixed with this concentrated juice to restore the flavoring components. Technique for preparing such full-flavored concentrates on a commercial scale are set forth in U. S. Dept. of Agriculture mimeographed circular AIC–293, November 1950, entitled Frozen-Apple Juice Concentrate: Application of Laboratory Data to Prospective Commercial Operations.

Another advantage of our invention is that we can effect savings in the amount of juice concentrate without any sacrifice in flavor of the final product. Thus a frozen confection made with the impregnated fruit pieces requires a total amount of concentrate of two-thirds that required for a confection made with concentrate alone. This is due to the fact that the impregnated fruit pieces provide localized points of concentrated flavor in the product. As an example, a sherbet produced in accordance with this invention and containing a total of 15% of 50° Brix apple juice concentrate would have fully as much flavor as a sherbet containing only the concentrate in an amount of 20%.

To prepare products in accordance with this invention the following steps are carried out:

The desired fruit, which may be for example apples, pears, peaches, apricots, berries, etc., is first subjected to the usual preparative steps such as washing, peeling, coring, etc., then cut into small pieces. Generally dice about $\frac{1}{8}''$ x $\frac{1}{4}''$ x $\frac{1}{4}''$ are suitable.

The fruit pieces are then impregnated with the full-flavored fruit juice concentrate. This process may be carried out in several ways. Thus the pieces may be simply soaked in the concentrate. Preferably, we use a vacuum process to give more rapid impregnation. To this end, the fruit pieces are placed in a bath of the concentrate in a closed vessel which is subjected to a vacuum to remove most of the air present in the fruit tissues. The vacuum is released whereupon the concentrate rapidly fills the interstices in the fruit tissue. The impregnation whether by application of vacuum or by soaking is conducted at room temperature or below. Heating of the fruit to effect impregnation is to be avoided because heat softens the fruit excessively and, in many fruits, results in undesirable cooked flavors.

If it is not convenient to use the impregnated fruit pieces soon after they are prepared, they may be frozen and stored in the frozen state until needed. A convenient way of preparing the impregnated apples and at the same time preparing them for storage involves placing the fresh fruit pieces in a suitable container such as a 5-gallon open-top can and adding about an equal weight of the concentrate. The can is then closed and placed in a freezer; the impregnation occurs before the product can become frozen. When the product is ready to be used, the contents of the can are thawed and the fruit pieces removed and drained. The remaining fruit concentrate may be used in whole or in part as a flavoring agent in the sherbet or other confection mix.

In carrying out the impregnation, the soluble solids content of the fruit pieces should be increased to at least 25%. The soluble solids content may be increased as much as desired above this level, although we prefer to use an upper limit of about 35%. Since the soluble solids content of the fruit is to be raised to at least 25%, the fruit juice concentrate used for the impregnation should contain more than 25% soluble solids. To insure rapid impregnation, we usually prefer to use a concentrate of about 40° to about 60° Brix, these degrees Brix corresponding approximately to the percent of sugar. The duration of the soaking or vacuum impregnation will of course depend on the size of the fruit pieces and the concentration of solubles in the concentrate. The proper duration in any event can be determined by removing fruit pieces from time to time and determining the soluble solids content thereof. The procedure can then be discontinued when the proper solids content is attained. The concentrate remaining after the impregnation process has a decreased sugar content and hence is not suitable for use in further impregnations but can be used as a flavoring agent in the mix into which the impregnated fruit pieces are incorporated.

Usually we prefer to impregnate the fruit with a concentrate of the same fruit, i. e., apple dice with apple juice concentrate. However such technique is not essential and interesting combinations can be made by impregnating with different fruit-juice concentrates, thus, the apple dice may be impregnated with a strawberry or cherry juice concentrate. Further extensions of this principle will be obvious to those skilled in the art.

Where the fruit is normally subject to browning as in the case of apples, pears, peaches, etc., the tendency to brown can be prevented by incorporating with the concentrate which is to be used for the impregnation a minor amount, about 0.05% to about 0.2% of ascorbic acid. Instead of such a technique, prior to the impregnation the fruit pieces may be dipped in or sprayed with a solution of ascorbic acid, or a sulphiting agent such as sulphur dioxide, sodium bisulphite, or sodium sulphite.

The impregnated fruit pieces are then incorporated into a usual type of sweetened and flavored edible liquid. By edible liquid we mean water, milk, cream, or mixtures thereof. The mixture is then aerated and frozen in the customary manner. The liquid to be used will depend on the type of frozen confection desired and may be of the ice, sherbet or ice cream type. Recipes for preparing such confections are of course well known to those skilled in the art. To further give the product a true fruit taste, one may add to the mix some of the full-flavored fruit juice concentrate as a flavoring agent.

The following examples demonstrate the invention in greater detail. These examples are given only by way of illustration and not limitation.

*Example I*

Fresh apples were peeled, cored and cut into dice $\frac{1}{4}''$ x $\frac{1}{4}''$ x $\frac{1}{8}''$. The dice were placed in a vessel and covered with a 50° Brix full-flavored apple juice concentrate (containing 0.1% ascorbic acid). The vessel was closed and a vacuum applied to reduce the pressure to 1 lb. per square inch which was maintained for 5 minutes. The vacuum was released and the dice were allowed to soak in the concentrate for 5 minutes. The dice were then removed and drained. It was determined that the impregnation had increased the soluble solids content of the apple dice from 15% to 26%.

The impregnated apple dice (515 g.) and 260 g. of 50° Brix full-flavored apple juice concentrate were added to 2310 g. of sherbert mix having the following composition:

| | Grams |
|---|---|
| Whole milk | 1320 |
| Dried skim milk | 32 |
| Sucrose | 346 |
| Corn syrup | 229 |
| Pectin | 9 |
| Gelatin | 5 |
| Water | 369 |

The mixture of the apple dice, concentrate, and sherbert mix was frozen with aeration in a conventional batch-type ice cream freezer.

The product was tasted and found to have a good, natural apple flavor. The apple dice had a soft texture and were completely free from iciness.

Example II

Fifteen pounds of apple dice (¼" x ¼" x ⅛") were placed in a can and covered with 15 lbs. of 44° Brix full-flavored apple juice concentrate containing 0.2 g. ascorbic acid. After about a half-hour, the apple dice were removed and drained. The soluble solids content of the drained dice and the residual concentrate were 27% and 33%, respectively.

A sample of the impregnated dice (403 g.) and 376 g. of the residual concentrate were added to 2310 g. of ice cream mix of the following composition:

| | Grams |
|---|---|
| 20% cream | 1617 |
| Dried skim milk | 123 |
| Sucrose | 370 |
| Stabilizer | 11 |
| Water | 189 |

The mixture was frozen with aeration in a conventional ice-cream freezer. The product was tasted and was found to have a good, natural apple flavor. The apple dice had a soft texture and were completely free from iciness.

Example III

Bartlett pears were peeled, cored, and cut into dice ¼" x ¼" x ⅛". The dice were soaked about a half hour in an equal weight of 52° Brix full-flavored pear juice concentrate containing 0.1% ascorbic acid. The dice were then drained and found to have a soluble solids content of 30%, whereas the residual concentrate contained 34% of soluble solids. 345 g. of the impregnated pear dice, and 345 g. of the residual pear concentrate were added to 2310 grams of sherbet mix of the same composition as in Example I. The mixture was then frozen with aeration in a conventional ice cream freezer. The product was tasted and found to have a good, natural pear flavor. The pear dice had a soft texture and were completely free from iciness.

Having thus described our invention, we claim:

1. The process which comprises impregnating pieces of fruit with a full-flavored fruit juice concentrate, mixing the impregnated fruit with a sweetened, flavored edible liquid and freezing the mixture whereby to prepare a frozen confection in which the fruit pieces have a soft texture and an enhanced natural fruit flavor.

2. The process which comprises impregnating pieces of fruit with a full-flavored fruit juice concentrate to increase the solids content of the fruit to at least about 25%, mixing the impregnated fruit with a sweetened, flavored edible liquid and freezing the mixture whereby to prepare a frozen confection in which the fruit pieces have a soft texture and an enhanced natural fruit flavor.

3. The process of claim 2 wherein the fruit is apple.

4. The process of claim 2 wherein the fruit is pear.

5. The process which comprises impregnating pieces of raw fruit at room temperature or below with a full-flavored fruit juice concentrate to increase the soluble solids content of the fruit to at least about 25%, mixing the impregnated fruit with full-flavored fruit juice concentrate and a sweetened edible liquid, then freezing the mixture whereby to prepare a frozen confection in which the fruit pieces have a soft texture and an enhanced natural fruit flavor.

6. The process of claim 5 wherein the fruit is apple.

7. The process of claim 5 wherein the fruit is pear.

8. A frozen confection comprising a matrix of a frozen sweetened, flavored edible liquid and pieces of fruit impregnated with a full-flavored fruit juice concentrate.

9. A frozen confection comprising a matrix of a frozen, sweetened, flavored, edible liquid and discrete pieces of fruit impregnated with full-flavored fruit juice concentrate, the fruit pieces having a soluble solids content of at least about 25%.

10. The product of claim 9 wherein the fruit is apple.

11. The product of claim 9 wherein the fruit is pear.

12. A frozen confection comprising a matrix of a frozen, sweetened, edible liquid flavored with full-flavored fruit juice concentrate and discrete pieces of fruit impregnated with a full-flavored fruit juice concentrate, the fruit pieces having a soluble solids content of at least about 25%.

13. The product of claim 12 wherein the fruit is apple.

14. The product of claim 12 wherein the fruit is pear.

WILLIAM F. TALBURT.
DANTE G. GUADAGNI.

References Cited in the file of this patent

UNITED STATES PATENTS

| Number | Name | Date |
|---|---|---|
| 2,182,829 | Thomas | Dec. 12, 1939 |
| 2,550,656 | Knechtges | Apr. 24, 1951 |